United States Patent [19]

Mendenhall

[11] Patent Number: 5,472,725
[45] Date of Patent: Dec. 5, 1995

[54] ULTRA-HIGH TEMPERATURE TREATMENT OF LOW-FAT FORMED MEAT PRODUCTS

[75] Inventor: Von T. Mendenhall, Logan, Utah

[73] Assignee: Utah State University, North Logan, Utah

[21] Appl. No.: 380,305

[22] Filed: Jan. 30, 1995

Related U.S. Application Data

[63] Continuation-in-part of Ser. No. 316,033, Sep. 30, 1994, which is a continuation-in-part of Ser. No. 131,321, Oct. 4, 1993, Pat. No. 5,366,746, which is a continuation-in-part of Ser. No. 944,792, Sep. 14, 1992, abandoned, which is a continuation of Ser. No. 573,358, Aug. 27, 1990, abandoned.

[51] Int. Cl.$^6$ .................................. A23B 4/00; A23L 3/00
[52] U.S. Cl. ........................... 426/521; 426/290; 426/518; 426/519; 426/524
[58] Field of Search ................................ 426/520, 521, 426/290, 392, 393, 410, 518, 519, 641, 524

[56] References Cited

U.S. PATENT DOCUMENTS 3,285,752  11/1966  Hansen et al. .......................... 426/290

Primary Examiner—George Yeung
Attorney, Agent, or Firm—Thorpe North & Western

[57] ABSTRACT

A method is disclosed for preparing a surface-pasteurized, low-fat, formed meat product. The method comprises removing surface fat, bones, and gristle, and cutting the meat into pieces. The pieces are mechanically tenderized and then mixed with water, salt, and phosphate. The mixture is massaged at 0° to 15° C. so that fat is conducted out of the meat and deposited on the wall of the apparatus, and protein is exuded to form a sticky surface on the pieces of meat. This procedure reduces the fat content to less than about 5% by weight of the finished product. The fat content can be adjusted to a selected level, however, by mixing fat particles with the massaged meat. The massaged meat is then formed into a selected shape and frozen. The shaped meat is subjected to portion control either before or after freezing. The portions are then partially thawed, and the partially thawed portions are surface-pasteurized at ultra-high temperature (UHT), e.g. 900–1200° C., for a time sufficient to denature proteins, without burning, to a depth of up to about 2 mm. Grill markings are then placed on the meat. After UHT treatment the meat is refrozen, packaged in a modified atmosphere containing carbon dioxide and nitrogen gas, and stored frozen. The resulting raw, low-fat, formed meat product has an attractive grilled appearance and flavor, and can be stored for an extended period.

59 Claims, No Drawings

ULTRA-HIGH TEMPERATURE TREATMENT OF LOW-FAT FORMED MEAT PRODUCTS

BACKGROUND OF THE INVENTION

This is a continuation-in-part of application Ser. No. 08/316,033, filed Sep. 30, 1994, which is a continuation-in-part of application Ser. No. 08/131,321, filed Oct. 4, 1993, now U.S. Pat. No. 5,366,746, which is a continuation-in-part of application Ser. No. 07/944,792, filed Sep. 14, 1992, abandoned, which is a continuation of application Ser. No. 07/573,358, filed Aug. 27, 1990, abandoned.

This invention relates to pasteurization of meat and meat products by altering the character of the meat surface. More particularly, this invention relates to a method of combining ultra-high temperature pasteurization and a process of producing a formed meat product to produce a low-fat, raw meat product that can be stored for an extended period. Only the surface or visible portion of the meat product is altered with the remainder of the tissue below about 2 mm remaining in its raw or unaltered state. The invention also relates to preparation of a low-fat formed meat product by pasteurization of the meat surface by ultra-high temperature treatment combined with packaging in a modified atmosphere.

Extending the storage life of meat and meat products has been a subject of mankind's ingenuity since before recorded history. Many procedures have been developed, but they are all subject to certain limitations. Cooking, smoking, and curing all render meat less susceptible to spoilage, but the flavor of the meat is altered, sometimes drastically, and the meat is still subject to eventual spoilage. Chemical additives may be effective preservatives, but commercial acceptance and regulatory approval have been limiting factors. Meat can be frozen and stored for extended periods of time without seriously affecting flavor or palatability, but maintaining the meat in a frozen state is expensive.

Methods of sterilizing meat and other animal tissues with high temperature treatment have been described previously. U.S. Pat. No. 4,539,212 to Hunter teaches a process for sterilizing low-acid food containing meat or textured vegetable protein by acidifying the food, heating at high temperature (104°–137° C.) for a short time (5–60 seconds), and packing with a hot-fill-and-hold procedure. U.S. Pat. No. 4,572,839 to Guitteny et al. teaches a method of high temperature sterilization of animal protein by grinding the raw material to make a slurry, partially hydrolyzing it, and heating a thin layer of the slurry to about 120°–150° C. for about 3 seconds to 15 minutes. U.S. Pat. No. 4,675,202 to Wenger et al. discloses a method of sterilizing a slurry containing egg yolks by acidifying and then heating at temperatures between 128°–155° C. for a period of 1–50 seconds. U.S. Pat. No. 4,201,796 to Harkins discloses a method of cooking meat by searing the surface of a cut or patty of meat by brief exposure to a blow torch pencil burner while leaving the inside of the meat relatively raw, refrigerating or freezing the meat, and cooking thoroughly in a microwave oven. U.S. Pat. No. 5,366,746 to Mendenhall discloses a method of pasteurizing meat and meat products for extended storage at refrigerated temperatures by treating the meat at ultra-high temperature (UHT), e.g. 900° to 1200° C., for a time sufficient to denature proteins, without burning, to a depth of up to about 2 mm.

Formed meat products are well known in the art. For example, U.S. Pat. No. 4,539,210 to O'Connell et al. describes a process of making a structured meat product that can resemble a natural cut of meat. The product is made by removing fat, gristle, sinew, and skin from large primal cuts of meat and then cutting the meat into quarter-pound chunks. These meat chunks are then tenderized by severing the connective tissue of the meat. The tenderized chunks are then massaged under reduced pressure with water and a water soluble salt and/or phosphate so that a sticky protein exudate is caused to come to the surface of the meat chunks. The meat chunks are then extruded with a fat emulsion formed from the fat trimmings of the primal cuts to produce the structured meat product with a fat cap or rim. Other patents that disclose similar products and processes include U.S. Pat. Nos. 4,975,294 to Cohen; 4,810,514 to Guenther; 4,377,597 to Shapiro et al.; 4,264,633 to Bradshaw; 4,210,677 to Huffman; 3,821,445 to Okamura et al.; 3,679,434 to Bard et al.; and 3,499,767 to Schlamb.

In view of the foregoing, it will be appreciated that providing a method of preparing a surface-pasteurized, low-fat, formed meat product that can be stored for an extended period would be a significant advancement in the art.

OBJECTS AND SUMMARY OF THE INVENTION

An object of the present invention is to provide a method of producing a low-fat, formed meat product that can be stored for an extended period.

Another object of the invention is to provide a method of making a low-fat, formed meat product that can be surface-pasteurized by exposure to ultra-high temperature.

Still another object of the invention is to provide a method of preparing a surface-pasteurized, low-fat, formed meat product that has the appearance of cooked meat, but is raw.

These and other objects can be accomplished by providing a method of preparing a low-fat, formed meat product comprising the steps of:

(a) mechanically tenderizing a plurality of pieces of meat so that multiple incisions or channels extending from the exterior surface to the interior are formed;

(b) adding salt, phosphate, and water to the tenderized pieces of meat to form a mixture and massaging the mixture in a tumbling apparatus at a temperature in the range of about 0° C. to about 15° C. so that fat is transported through the incisions or channels and deposited on the wall of the apparatus and so that protein is exuded to form an adhesive layer on the exterior surface of the pieces of meat; and (c) forming the massaged pieces of meat together into a selected shape. Optionally, the massaged meat can be bonded to a bone while being formed into the selected shape. The fat content of the formed meat product can be reduced to below about 5% by weight by sufficient massaging of the meat-containing mixture, but a selected fat content can be obtained by adding fat particles before forming the massaged pieces of meat into the selected shape. Salt, phosphate, and water are added in amounts so that the formed meat product comprises in the range of about–0.3 to about 0.6% salt, about 0.10 to about 0.19% phosphate, and about 70% to about 80% water, and, preferably, the formed meat product comprises about 0.5% salt, about 0.15% phosphate, and about 75% water, wherein all percentages are by weight. A flavoring agent can also be added to the mixture. The formed meat can be surface-pasteurized by freezing the formed meat and subjecting the formed meat to portion control to result in frozen portions, partially thawing the frozen portions to a depth of about 1 mm, and treating the partially thawed portions at ultra-high temperature in the range of about 900° C. and about 1200° C. for a time sufficient to denature surface proteins, without burning, to a depth of not more than about 2 mm. This gives the raw formed meat product the appearance of a cooked meat. The surface-pasteurized formed meat product can then be packaged, optionally in a modified atmosphere under reduced pressure, and stored frozen.

A method of preparing a surface-pasteurized, low-fat, formed meat product that can be stored for an extended period of time comprises the steps of:

(a) mechanically tenderizing a plurality of pieces of meat so that multiple channels extending from the exterior surface to the interior are formed;

(b) adding salt, phosphate, and water to the tenderized pieces of meat to form a mixture and massaging the mixture in a tumbling apparatus at a temperature in the range of about 0° C. to about 15° C. so that fat is transported through the channels and deposited on the wall of the apparatus and so that protein is exuded to form an adhesive layer on the exterior surface;

(c) forming the massaged pieces of meat into a selected shape;

(d) freezing the formed meat and subjecting the formed meat to portion control to result in frozen portions;

(e) partially thawing the frozen portions to a depth of about 1 mm and treating the partially thawed portions at ultra-high temperature in the range of about 900° C. and about 1200° C. for a time sufficient to denature surface proteins, without burning, to a depth of not more than about 2 mm; and (f) freezing the ultra-high-temperature-treated portions and packaging them, optionally, in a modified atmosphere under reduced pressure.

Massaging the meat-containing mixture for a sufficient time reduces the fat content to below about 5% by weight, but fat particles can be mixed with the massaged meat to obtain a selected fat content. Optionally, the massaged meat can be bonded to a bone. The salt, phosphate, and water are added in amounts so that the formed meat product comprises in the range of about 0.3 to about 0.6% salt, about 0.10 to about 0.19% phosphate, and about 70% to about 80% water, and preferably, about 0.5% salt, about 0.15% phosphate, and about 75% water, wherein all percentages are by weight. A flavoring agent can also be added to the mixture. The modified atmosphere comprises in the range of about 80% to about 100% carbon dioxide and about 0% to about 20% nitrogen gas. The packaging can be in a microwavable film so that the meat product can be cooked in a microwave oven or by any other conventional method.

DETAILED DESCRIPTION OF THE INVENTION

Before the present method of producing a surface-pasteurized, low-fat, formed meat product that can be stored for an extended period is disclosed and described, it is to be understood that this invention is not limited to the particular process steps and materials disclosed herein as such process steps and materials may vary somewhat. It is also to be understood that the terminology employed herein is used for the purpose of describing particular embodiments only and is not intended to be limiting since the scope of the present invention will be limited only by the appended claims and equivalents thereof.

It must be noted that, as used in this specification and the appended claims, the singular forms "a," "an," and "the" include, plural referents unless the content clearly dictates otherwise. Thus, for example, reference to a "a flavoring agent" includes reference to a mixture of two or more of such flavoring agents, reference to "a salt" includes reference to a mixture of two or more of such salts, and reference to "a phosphate" includes reference to a mixture of two or more such phosphates.

In describing and claiming the present invention, the following terminology will be used in accordance with the definitions set out below.

As used herein, "meat" means those soft animal tissues that are suitable for use as food including, but not limited to beef, pork, lamb, poultry, and fish.

As used herein, "formed meat product," "formed meat," and similar terms mean a product prepared by pressing, bonding, extruding, or otherwise coupling chunks of meat into a selected shape, usually to resemble the shape of a natural cut of meat.

As used herein, "salt" means NaCl, KCl, $MgCl_2$, $CaCl_2$, or mixtures thereof, with NaCl, KCl, or mixtures thereof being preferred.

As used herein, "phosphate" means sodium, potassium, or ammonium pyrophosphates; sodium, potassium, or ammonium polyphosphates; sodium, potassium, or ammonium tripolyphosphates; trisodium, tripotassium, or triammonium phosphates; sodium, potassium, or ammonium hexametaphosphates; sodium, potassium, or ammonium orthophosphates; other food grade phosphates; and mixtures thereof. Preferred phosphates are tetrasodium pyrophosphate, acid sodium pyrophosphate, and glassy sodium polyphosphate.

As used herein, "ultra-high temperature" or "UHT" means temperatures in the range of about 900° C. to about 1200° C.

As used herein, "modified atmosphere" means an atmosphere, without oxygen gas, containing in the range of about 80% to about 100% carbon dioxide and in the range of about 0% to about 20% nitrogen gas.

As used herein, "portion control" means producing serving-size portions of substantially identical size, shape, and weight.

It is desirable to create formed meat that, when cooked, has a natural shape and texture or has a natural shape and texture of a cut of meat that is more expensive than the meat used to create the formed meat. Further, it is desirable to have a formed meat that, in addition to having a natural shape and texture, has a lower amount of fat than the meat used to create the formed meat.

The process described herein is limited to imitating different cuts of meat from the same type of animal because the flavor of any given type of animal is unique. Within a given type of animal, the texture of different cuts of meat is very similar except for tenderness. Thus, cheaper cuts of meat are tenderized to imitate higher priced cuts of meat.

Initially, external fat, bones, and gristle are cut and removed from the large primal cuts of meat, and the remaining lean meat is cut into pieces. The size of the pieces of meat is not critical, however, the larger the pieces are, the more natural will be the texture of the finished formed meat product. The maximum size of the pieces, though, is limited by the capacity of the mechanical tenderizer used in the next step of the process. Therefore, a preferred size of the pieces of meat is an average weight of about 100 grams and an average minimum thickness of about 2.5 centimeters. Variations from these sizes are considered within the scope of the invention inasmuch as a person skilled in the art could, as a matter of routine optimization, adjust the size of the meat pieces according to the equipment being used.

Each piece of meat is then mechanically tenderized, preferable with multi-blade tenderizing equipment, such as a "BERKEL 704 MULTIBLADE" (Berkel Corp., LaPorte, Ind.). This step comprises severing the scaffold network or lattice of connective tissue that supports the muscle cells. This scaffold network is broken by making numerous incisions into the pieces of meat with the blades of the tenderizing equipment. The blades make cuts deep into the meat and also abrade the surface thereof. The cuts or incisions form channels that extend from the surface into the interior of the meat. The temperature at which tenderization is conducted is not critical to the process, but is routinely done at about 4.4° C. (40° F.). The meat should not be ground because grinding breaks muscle fibers excessively, thus preventing attainment of a natural texture. At the end of this step, the pieces of meat comprise slackened muscle tissue on a multiply severed connective tissue supporting network, the slackened muscle tissue also containing channels extending from the surface of the meat into the interior thereof.

Next, the tenderized meat pieces are combined with enough salt, phosphate, and water so that the final formed meat product contains in the range of about 0.3 to about 0.6% salt, about 0.10 to about 0.19% phosphate, and about 70% to about 80% water, wherein all percentages are by weight. Preferably, the final formed meat product contains about 0.5% salt, about 0.15% phosphate, and about 75% by weight water.

Next, the mixture of meat, salt, phosphate, and water is massaged by tumbling for at least about 30 minutes in commercial tumbling equipment, such as a "ROSCHER-MATIC" (Röscherwerke GMBH, Germany). Preferably, this massaging step is conducted in an oxygen-free atmosphere. During this massaging step, the temperature of the meat-containing mixture and the walls of the tumbling equipment are maintained in the range of about 0° C. to about 15° C. (about 32° F. to about 59° F.). This temperature range and the tenderizing step are critical for maximizing extraction of fat from the pieces of meat. The free water added to the pieces of meat in the previous step aids in transporting fat from the pieces of meat to the walls of the tumbling or massaging equipment, where the extracted fat solidifies and is deposited. The fat exits the meat through the incisions or channels made during the tenderization step. Upon removing the massaged meat from the tumbling equipment, the fat deposited on the wall of the equipment is separated from the meat. This procedure generally reduces the fat content of the meat, leaving the finished product with less than about 5% fat by weight.

Optionally, one or more flavoring agents can be blended into the mixture after massaging. Fat content can also be adjusted to a selected level at this stage of the process. Fat contributes to texture and juiciness of the meat, thus some consumers prefer a higher level of fat that 5%. Fat is frozen and then ground through a plate with 0.3 cm openings. After grinding, the fat is refrozen and then chopped to an average particle size of 2–3 mm. The chopped fat particles are added to the massaged meat using a mixer-blender, such as a "KOCH/FATOSA" (Koch, Kansas City, Mo.). This allows the production of formed meat, e.g. steaks, with a fat level at a selected level, preferably between about 5 and about 20% by weight. Preferably, if fat is added to the massaged meat, then the amount of water added is reduced by a percentage equal to the percentage by weight of added fat.

During the massaging step, the added salt and phosphate facilitate solubilization of protein and bonding of water to the protein so that protein is exuded to the surface of the meat, creating an adhesive surface on the pieces of meat. After the massaging step is completed, during which the fat content of the meat is reduced and the adhesive surface is produced, the pieces of meat are then formed into a selected shape. This step of forming the meat into a shaped product can be by pressing the pieces together, bonding, extrusion, or other methods that are known to persons skilled in this art. During this step of the process, the adhesive layers of the massaged meat cause the pieces of meat to be coupled together by protein-protein bonding.

It is also within the scope of the invention to form a meat product having a bone bonded to the meat according to the method of Ser. No. 08/213,950, filed Mar. 23, 1994, now U.S. Pat. No. 5,387,424, hereby incorporated by reference. Briefly, a bone is cut from a piece of meat so that a thin layer of meat is left on the bone. The bone is then soaked in an aqueous solution of salt and phosphate so that proteins are extruded to form an adhesive protein layer on the surface of the thin layer of meat. Massaged meat, prepared as described above, is then formed around the bone to achieve a selected shape. The same type of protein-to-protein bonds that hold the formed meat together also hold the formed meat to the thin layer of meat that is left on the bone, thus bonding the formed meat to the bone.

After the meat is formed into an appropriate shape, such as the shape of a primal cut, the low-fat, formed meat is frozen. The temperature for freezing the formed meat is not critical, but is routinely done at between about −10° and −40° C. with a temperature of about −34.4° C. (−30° F.) being optimal or preferred. After freezing, serving-size portions of substantially identical size, shape, and weight can be cut from the frozen primal-shaped formed meat product, a step referred to as portion control, and these frozen portions are partially thawed to a depth of about 1 mm. Portion control is routinely conducted at a non-critical temperature in the range of about −4.4° C. to about −3.3° C. (about 24° to about 26° F.).

An alternative method of achieving portion control comprises forming the portions directly from the massaged meat. A commercially available machine, "FORMAX" (Mokena, Ill.), can be used for this purpose. The portions are formed at about 0.5° C. (33° F.) and then frozen at about −10° to about −40° C. Before UHT treatment the portions are partially thawed to a depth of about 1 mm, as with portions cut from a primal-shaped formed meat.

The partially thawed portions of low-fat, formed meat are then exposed to treatment with UHT. The specific method used for treating meat with UHT to obtain the results disclosed herein are described in U.S. Pat. No. 5,366,746, hereby incorporated by reference. The method involves placing the partially thawed portions in a closed heat source, e.g., an electric oven, maintained at a temperature in the range of about 900° C. and 1200° C. for a time sufficient to denature surface proteins up to a depth of not more than about 2 mm, i.e. typically between about 5 and 60 seconds. The oven is heated to the selected temperature, the partially thawed portions are placed on a grill outside the oven, and then the oven is opened and the meat and grill are placed in the oven for the selected length of time. Then, the meat is removed from the oven. The internal temperature of the meat never exceeds about −17.8° C. (0° F.) during the UHT treatment. The UHT-treated meat is then marked with grill marks, refrozen, and packaged as will be described in more detail below.

The acceptable temperature for UHT treatment is in a range of about 900° C. to about 1200° C. with a range of about 1000° C. to about 1200° C. being preferred and about 1100° C. being most preferred. By use of the term "about" is meant that some variation is possible inasmuch as it is virtually impossible to maintain a constant temperature without any fluctuation. Therefore variations of from ±25° C. from that stated are considered acceptable. Exposure times of 5–60 seconds at these temperatures produce a raw, low-fat, formed meat product with an attractive appearance with a denaturation depth of less than about 2 mm and preferably less than about 1 mm. Under these conditions, shrinkage and internal temperature are kept within acceptable limits. Further, UHT pasteurization of the surface of the meat destroys vegetative pathogens and reduces spoilage microorganisms to very low levels on the surface, as shown in U.S. Pat. No. 5,366,746.

Preferably, grill marks are placed on the meat after UHT treatment by placing the UHT-treated meat portions on a heated grill surface. These grill marks give the meat an attractive grilled (cooked) appearance even though the meat is still raw.

The next step in the instantly disclosed process comprises packaging the ultra-high temperature treated meat. Optionally, this packaging can be in a modified atmosphere under reduced pressure. Heretofore, high levels (80–100%) of carbon dioxide gas mixed with nitrogen gas have not been used to package raw meat because of the adverse effect of such gas on the color of the meat. Unexpectedly, it has been discovered that the color and flavor of UHT pasteurized meat remain stable during storage in a carbon dioxide atmosphere, as disclosed in copending application Ser. No. 08/316,033, filed Sep. 30, 1994, hereby incorporated by reference. Thus, the ultra-high temperature treated meat can be packaged, optionally, in a modified atmosphere containing in the range of about 80% to about 100% carbon dioxide. A preferred modified atmosphere comprises about 80% carbon dioxide and about 20% nitrogen gas. This packaging step is done under reduced pressure, referred to in the art as vacuum packaging. The temperature of the vacuum packaging step is not critical, but is routinely done between about 0° and 10° C. (32–50° F.) and most preferably at about 4.4° C. (40° F.). After vacuum packaging, the finished product is stored frozen, such as between about −10° to −25° C. (14° to −13° F.) and usually at about −17.8° C. (0° F.). Packaging in an oxygen-free atmosphere reduces oxidation of fat in the meat, thus extending shelf life, reducing development of off flavors, and maintaining the natural color of the meat.

The packaging material is preferably a film that is tolerant of being subjected to microwave energy so that preparation for cooking is minimized. A preferred microwavable film is a "NYLON" film, but other films are known and could be selected as a matter of routine by a person skilled in the art without undue experimentation. With a microwavable film, the preparation for cooking can be as simple as puncturing the packaging material, placing the product in a microwave oven, and heating until a safe internal cooked temperature of greater than 64° C. is obtained. The UHT-treated, low-fat, formed meat product can also be cooked in a conventional oven or by other known methods.

EXAMPLE

This example compares the water, protein, fat, ash, and caloric contents of 100 g portions of raw beef, pork, or lamb with 100 g portions of raw, formed meat product made from beef, pork, or lamb according to the procedure of the present invention.

TABLE

| | Mean Composition of 100 g Portions | |
|---|---|---|
| | Unprocessed | Formed |
| Water | 60 g | 76 g |
| Protein | 17 g | 16.5 g |
| Fat | 22 g | 5 g |
| Ash | 1 g | 2.5 g |
| Kcal | 266 | 111 |

As shown in the Table, the protein content of the formed meat product ("formed") remains virtually unchanged as compared to the unprocessed meat ("unprocessed"). The fat content and caloric content of the formed product, however, are significantly reduced. The amount of fat is reduced to about 5% by weight of the meat product, a reduction of about 77% in the total amount of fat as compared to the unprocessed meat. The caloric content of the formed meat product is reduced to 111 Kcal/100 g, a reduction of about 58% as compared to the unprocessed meat.

Another unique advantage of this process is that it produces a raw meat product that has the appearance of a cooked meat, e.g. a grilled steak. Since the meat is raw, subsequent cooking of the meat avoids the warmed-over-flavor typical of cooked meat that is reheated. Further, cooking of a meat product according to the instant process does not require the attention of a chef that cooking "unprocessed" meat requires, since the final appearance of the surface of the meat has already been determined in large part by the UHT treatment and grill marking steps. For these reasons, this formed meat product would be highly desirable in the food service industry.

I claim:

1. A method of preparing a surface-pasteurized, low-fat, formed meat product that can be stored for an extended period of time comprising the steps of:

(a) mechanically tenderizing a plurality of pieces of meat, said pieces each containing an exterior surface and an interior, such that multiple channels extending from the exterior surface to the interior are formed;

(b) adding salt, phosphate, and water to the tenderized pieces of meat to form a mixture and massaging the mixture in a tumbling apparatus at a temperature in the range of about 0° C. to about 15° C. such that fat is transported through the channels and deposited on a wall of the tumbling apparatus and such that protein is exuded to form an adhesive layer on the exterior surface;

(c) forming a plurality of massaged pieces of meat into a selected shape;

(d) freezing the formed meat and subjecting the formed meat to portion control to result in frozen portions;

(e) partially thawing the frozen portions to a depth of about 1 mm and treating the partially thawed portions at ultra-high temperature in the range of about 900° C. and about 1200° C. for a time sufficient to denature surface proteins, without burning, to a depth of not more than about 2 mm; and (f) freezing the ultra-high-temperature-treated portions and packaging them.

2. The method of claim 1 wherein the mixture of meat, salt, phosphate, and water is massaged for a sufficient time to reduce the fat content to not more than about 5% by weight.

3. The method of claim 2 further comprising adjusting the fat content of the massaged meat to a selected level in the range of about 5 to about 20% by weight by mixing fat particles with the massaged meat.

4. The method of claim 3 wherein the mixture further comprises a flavoring agent.

5. The method of claim 3 wherein step (c) further comprises bonding said formed meat to a bone.

6. The method of claim 3 wherein the salt is a member selected from the group consisting of NaCl, KCl, MgCl$_2$, CaCl$_2$, and mixtures thereof, and the phosphate is a member selected from the group consisting of sodium, potassium, and ammonium pyrophosphates; sodium, potassium and ammonium polyphosphates; sodium, potassium, and ammonium tripolyphosphates; trisodium, tripotassium, and triammonium phosphates; sodium, potassium, and ammonium hexametaphosphates; sodium, potassium, and ammonium orthophosphates; and mixtures thereof.

7. The method of claim 6 wherein the salt is a member selected from the group consisting of NaCl, KCl, and mixtures thereof, and the phosphate is a member selected from the group consisting of tetrasodium pyrophosphate, acid sodium pyrophosphate, and glassy sodium polyphosphate.

8. The method of claim 7 wherein the salt, phosphate, and water are added in amounts such that the formed meat product comprises in the range of about 0.3 to about 0.6% salt, about 0.10 to about 0.19% phosphate, and about 70% to about 80% water, wherein all percentages are by weight.

9. The method of claim 8 wherein the ultra-high temperature treatment is for a time in the range of about 5 to about 60 seconds.

10. The method of claim 9 wherein said surface proteins are denatured to a depth of not more than about 1 mm.

11. The method of claim 10 wherein the ultra-high temperature is in the range of about 1000 and about 1200° C.

12. The method of claim 11 wherein the ultra-high temperature treatment is at a temperature of about 1100° C. for a time of about 30 seconds.

13. The method of claim 12 further comprising marking the ultra-high temperature treated portions with grill marks.

14. The method of claim 13 wherein the salt, phosphate, and water are added in amounts such that the formed meat product comprises about 0.5% salt, about 0.15% phosphate, and about 75% water, wherein all percentages are by weight.

15. The method of claim 14 wherein said packaging step comprises packaging in a modified atmosphere comprising in the range of about 80% to about 100% carbon dioxide and about 0% to about 20% nitrogen gas.

16. The method of claim 15 wherein said modified atmosphere comprises about 80% carbon dioxide and about 20% nitrogen gas.

17. The method of claim 15 wherein said packaging is in a microwavable film.

18. The method of claim 15 wherein, in step (d), said freezing precedes said subjecting the meat to portion control.

19. The method of claim 15 wherein, in step (d), said subjecting the meat to portion control precedes said freezing.

20. A method of preparing a low-fat, formed meat product comprising the steps of:

(a) mechanically tenderizing a plurality of pieces of meat, said pieces each containing an exterior surface and an interior, such that multiple channels extending from the exterior surface to the interior are formed;

(b) adding salt, phosphate, and water to the tenderized pieces of meat to form a mixture and massaging the mixture in a tumbling apparatus at a temperature in the range of about 0° C. to about 15° C. such that fat is transported through the channels and deposited on a wall of the tumbling apparatus and such that protein is exuded to form an adhesive layer on the exterior surface; and (c) forming the massaged pieces of meat together into a selected shape.

21. The method of claim 20 wherein the mixture of meat, salt, phosphate, and water is massaged for a sufficient time to reduce the fat content to not more than about 5% by weight.

22. The method of claim 21 further comprising adjusting the fat content of the massaged meat to a selected level in the range of about 5 to about 20% by weight by mixing fat particles with the massaged meat.

23. The method of claim 22 wherein the mixture further comprises a flavoring agent.

24. The method of claim 22 wherein step (c) further comprises bonding said formed meat to a bone.

25. The method of claim 22 wherein the salt is a member selected from the group consisting of NaCl, KCl, MgCl$_2$, CaCl$_2$, and mixtures thereof, and the phosphate is a member selected from the group consisting of sodium, potassium, and ammonium pyrophosphates; sodium, potassium and ammonium polyphosphates; sodium, potassium, and ammonium tripolyphosphates; trisodium, tripotassium, and triammonium phosphates; sodium, potassium, and ammonium hexametaphosphates; sodium, potassium, and ammonium orthophosphates; and mixtures thereof.

26. The method of claim 25 wherein the salt is a member selected from the group consisting of NaCl, KCl, and mixtures thereof, and the phosphate is a member selected from the group consisting of tetrasodium pyrophosphate, acid sodium pyrophosphate, and glassy sodium polyphosphate.

27. The method of claim 26 wherein the salt, phosphate, and water are added in amounts such that the formed meat product comprises in the range of about 0.3 to about 0.6% salt, about 0.10 to about 0.19% phosphate, and about 70% to about 80% water, wherein all percentages are by weight.

28. The method of claim 27 wherein the salt, phosphate, and water are added in amounts such that the formed meat product comprises about 0.5% salt, about 0.15% phosphate, and about 75% water, wherein all percentages are by weight.

29. The method of claim 28 further comprising the steps of (d) freezing the formed meat and subjecting the formed meat to portion control to result in frozen portions; and (e) partially thawing the frozen portions to a depth of about 1 mm and treating the partially thawed portions at ultra-high temperature in the range of about 900° C. and about 1200° C. for a time sufficient to denature surface proteins, without burning, to a depth of not more than about 2 mm.

30. The method of claim 29 wherein the ultra-high temperature treatment is for a time in the range of about 5 to about 60 seconds.

31. The method of claim 30 wherein said surface proteins are denatured to a depth of not more than about 1 mm.

32. The method of claim 31 wherein the ultra-high temperature is in the range of about 1000° C. and about 1200° C.

33. The method of claim 32 wherein the ultra-high temperature treatment is at a temperature of about 1100° C. for a time of about 30 seconds.

34. The method of claim 33 further comprising marking the ultra-high temperature treated portions with grill marks.

35. The method of claim 34 further comprising freezing the ultra-high-temperature-treated portions and packaging them in a modified atmosphere under reduced pressure.

36. The method of claim 35 wherein said modified atmosphere comprises in the range of about 80% to about 100% carbon dioxide and about 0% to about 20% nitrogen gas.

37. The method of claim 36 wherein said modified atmosphere comprises about 80% carbon dioxide and about 20% nitrogen gas.

38. The method of claim 36 wherein said packaging is in a microwavable film.

39. The method of claim 36 wherein, in step (d), said freezing precedes said subjecting the meat to portion control.

40. The method of claim 36 wherein, in step (d), said subjecting the meat to portion control precedes said freezing.

41. A surface-pasteurized, low-fat, formed meat product that can be stored for an extended period of time prepared by a process comprising the steps of:

(a) mechanically tenderizing a plurality of pieces of meat, said pieces each containing an exterior surface and an interior, such that multiple channels extending from the exterior surface to the interior are formed;

(b) adding salt, phosphate, and water to the tenderized pieces of meat to form a mixture and massaging the mixture in a tumbling apparatus at a temperature in the range of about 0° C. to about 15° C. such that fat is transported through the channels and deposited on a wall of the tumbling apparatus and such that protein is exuded to form an adhesive layer on the exterior surface;

(c) forming a plurality of massaged pieces of meat into a selected shape;

(d) freezing the formed meat and subjecting the formed meat to portion control to result in frozen portions;

(e) partially thawing the frozen portions to a depth of about 1 mm and treating the partially thawed portions at ultra-high temperature in the range of about 900° C. and about 1200° C. for a time sufficient to denature surface proteins, without burning, to a depth of not more than about 2 mm; and (f) freezing the ultra-high-temperature-treated portions and packaging them.

42. The surface-pasteurized, low-fat, formed meat product of claim 41 wherein the mixture of meat, salt, phosphate, and water is massaged for a sufficient time to reduce the fat content to not more than about 5% by weight.

43. The surface-pasteurized, low-fat, formed meat product of claim 42 wherein the process further comprises adjusting the fat content of the massaged meat to a selected level in the range of about 5 to about 20% by weight by mixing fat particles with the massaged meat.

44. The surface-pasteurized, low-fat, formed meat product of claim 43 wherein the mixture further comprises a flavoring agent.

45. The surface-pasteurized, low-fat, formed meat product of claim 43 wherein step (c) further comprises bonding said formed meat to a bone.

46. The surface-pasteurized, low-fat, formed meat product of claim 43 wherein the salt is a member selected from the group consisting of NaCl, KCl, $MgCl_2$, $CaCl_2$, and mixtures thereof, and the phosphate is a member selected from the group consisting of sodium, potassium, and ammonium pyrophosphates; sodium, potassium and ammonium polyphosphates; sodium, potassium, and ammonium tripolyphosphates; trisodium, tripotassium, and triammonium phosphates; sodium, potassium, and ammonium hexametaphosphates; sodium, potassium, and ammonium orthophosphates; and mixtures thereof.

47. The surface-pasteurized, low-fat, formed meat product of claim 46 wherein the salt is a member selected from the group consisting of NaCl, KCl, and mixtures thereof, and the phosphate is a member selected from the group consisting of tetrasodium pyrophosphate, acid sodium pyrophosphate, and glassy sodium polyphosphate.

48. The surface-pasteurized, low-fat, formed meat product of claim 47 wherein the salt, phosphate, and water are added in amounts such that the formed meat product comprises in the range of about 0.3 to about 0.6% salt, about 0.10 to about 0.19% phosphate, and about 70% to about 80% water, wherein all percentages are by weight.

49. The surface-pasteurized, low-fat, formed meat product of claim 48 wherein the ultra-high temperature treatment is for a time in the range of about 5 to about 60 seconds.

50. The surface-pasteurized, low-fat, formed meat product of claim 49 wherein said surface proteins are denatured to a depth of not more than about 1 mm.

51. The surface-pasteurized, low-fat, formed meat product of claim 50 wherein the ultra-high temperature is in the range of about 1000 and about 1200° C.

52. The surface-pasteurized, low-fat, formed meat product of claim 51 wherein the ultra-high temperature treatment is at a temperature of about 1100° C. for a time of about 30 seconds.

53. The surface-pasteurized, low-fat, formed meat product of claim 52 further comprising marking the ultra-high temperature treated portions with grill marks.

54. The surface-pasteurized, low-fat, formed meat product of claim 53 wherein the salt, phosphate, and water are added in amounts such that the formed meat product comprises about 0.5% salt, about 0.15% phosphate, and about 75% water, wherein all percentages are by weight.

55. The surface-pasteurized, low-fat, formed meat product of claim 54 wherein said packaging step comprises packaging in a modified atmosphere comprising in the range of about 80% to about 100% carbon dioxide and about 0% to about 20% nitrogen gas.

56. The surface-pasteurized, low-fat, formed meat product of claim 55 wherein said modified atmosphere comprises about 80% carbon dioxide and about 20% nitrogen gas.

57. The surface-pasteurized, low-fat, formed meat product of claim 55 wherein said packaging is in a microwavable film.

58. The surface-pasteurized, low-fat, formed meat product of claim 55 wherein, in step (d), said freezing precedes said subjecting the meat to portion control.

59. The surface-pasteurized, low-fat, formed meat product of claim 55 wherein, in step (d), said subjecting the meat to portion control precedes said freezing.

* * * * *